United States Patent [19]
Kellerman et al.

[11] Patent Number: 4,587,144
[45] Date of Patent: May 6, 1986

[54] LOW LOSS, COMPRESSION, HERMETIC GLASS-TO-METAL-SEAL AND METHOD

[76] Inventors: Hillel Kellerman, 9323 Duxbury Rd., Los Angeles, Calif. 90034; David Kellerman, 1485 S. Cardiff Ave., Los Angeles, Calif. 90025; Leonard J. Box, 1363 Pleasant Valley Way, West Orange, N.J. 07052

[21] Appl. No.: 377,790

[22] Filed: May 13, 1982

[51] Int. Cl.[4] .................. H01R 43/00; C03C 27/02
[52] U.S. Cl. ........................................ 428/36; 29/854; 65/59.31; 65/59.34; 65/59.4; 174/50.61; 174/152 GM; 228/122; 361/433; 429/181
[58] Field of Search .............. 29/854, 570, 589, 590; 174/50.61, 52 FP, 52 S, 152 GM; 361/433; 339/278 C; 403/28-30; 65/59.31, 59.33, 59.34, 59.4, 59.1, 59.22; 220/2.1; 228/122, 124; 429/181, 174; 428/36

[56] References Cited

U.S. PATENT DOCUMENTS

| | | | |
|---|---|---|---|
| 2,190,302 | 2/1940 | Waldschmidt | 174/50.61 X |
| 2,885,826 | 5/1959 | Grieve et al. | 174/152 GM |
| 3,188,720 | 6/1965 | Husni, Jr. | 174/152 GM |
| 3,243,668 | 3/1966 | Diggens | 65/59.31 X |
| 3,243,671 | 3/1966 | Heron, Jr. et al. | 65/59.34 X |
| 3,248,618 | 4/1966 | Szpak et al. | 174/52 S |
| 3,255,386 | 6/1966 | Millard et al. | 29/570 X |
| 3,418,423 | 12/1968 | Bronnes et al. | 228/122 X |
| 3,803,875 | 4/1974 | Root et al. | 65/59.1 X |
| 3,988,053 | 10/1976 | Dodenhoff | 339/278 C |
| 4,053,692 | 10/1977 | Dey | 429/181 X |
| 4,061,841 | 12/1977 | Sharma et al. | 429/174 X |
| 4,233,372 | 11/1980 | Bro et al. | 429/181 X |
| 4,334,628 | 6/1982 | Buhrer et al. | 174/152 GM X |
| 4,358,514 | 11/1982 | Garoutte et al. | 174/152 GM X |
| 4,377,404 | 3/1983 | Hoshikawa et al. | 65/59.22 |

FOREIGN PATENT DOCUMENTS 658227 10/1951 United Kingdom ............. 174/50.61

OTHER PUBLICATIONS

Handbook of Materials and Techniques for Vacuum Devices by W. H. Kohl (1967) pp. 600-601.
Metals Handbook (1948 ed) by ASM p. 1046.
Magnetism and Metallurgy eds A. E. Berkowitz et al. vol. 1, Chap 1 (1969) pp. 3-20.

*Primary Examiner*—Howard N. Goldberg
*Assistant Examiner*—Carl J. Arbes

[57] ABSTRACT

Glass-to-metal hermetic seal of the compression type in which a central metal eyelet is sealed to a central conductor, the eyelet being bondable to and having a coefficient of expansion characteristic compatible with glass in which the eyelet is made non-ferromagnetic to eliminate unwanted induction heating and losses in pulsatory current carrying operation. The method of forming the seal is disclosed.

9 Claims, 3 Drawing Figures

LOW LOSS, COMPRESSION, HERMETIC GLASS-TO-METAL-SEAL AND METHOD

BACKGROUND OF THE INVENTION

This present invention relates to compression, hermetic glass-to-metal seals and current feed-throughs. Such seals are commonly used as feed-throughs for signal conductors in hermetically sealed, metal cased capacitors, relays and other electronic components.

The invention has particular application in the manufacture of hermetic glass-to-metal seals for capacitors which handle high amperage current pulses, which may be AC or pulsating DC. It has been realized that hermetic glass-to-metal seals introduce heating and power loss when used as feed-throughs for signal conductors handling high amperage pulsating currents.

The purpose of this invention is to set forth improved compression-type, hermetic glass-to-metal seals which will provide significantly lower heating and power loss when used in high amperage pulsating current applications than prior art.

The following discussion will describe the manufacture of a compression, hermetic glass-to-metal seal, used in a metal cased hermetically sealed capacitor. However, it will be understood that the formation and use of a compression, hermetic glass-to-metal seal in accordance with the present invention is widely applicable to analogous structures, metal cased relays and other hermetically sealed electronic components.

The art of manufacturing compression, hermetic glass-to-metal seals is well-known and has been described by Mayer in U.S. Pat. No. 3,035,372. Such seals comprise an outer metal compression ring which contains an annular glass button through which is disposed a coaxial conductor assembly including an outer tube or eyelet and an inner conductor. Commonly the inner conductor is plain copper wire of a suitable gauge to carry the currents of the circuits involved. The outer tube or eyelet which surrounds the wire is used to obtain the essential glass to metal bond which is needed for hermeticity. Such compression seals are commonly manufactured in different manufacturing operations. In a first, high temperature stage, the ring, glass button, and tube are fired to form a unitary seal assembly. This assembly is mounted to a can such as a cylindrical tube containing the electrical components such as a capacitor such that the lead wire from the latter protrudes through the eyelet of the preassembled seal. The capacitor case and seal are then soldered together in the second stage at a temperature much lower than the initial manufacture of the seal. The conductor is soldered to the eyelet in a similar manner.

Prior art calls for the outer member (1) to be made of common steel the glass member (2) to be selected from the potash soda or potash lead type and the inner member (3) to be made of nickel 52, an iron nickel alloy containing about 52% nickel and 48% iron.

Examination of the thermal expansion properties of the materials shows that the outer ring (1) has higher thermal expansion than either the glass or central member so that the glass is placed in radial compression. Nickel 52 has a coefficient of thermal expansion slightly lower than the glass. The result is that the outer ring (1) transmits radial compression into the glass (2) which is transmitted to the inner member (3). For glasses of the type mentioned such as Corning 9010 or 9013 a good bond can be made to nickel 52. The physical strength and hermeticity of the just described prior art is excellent, and the physical integrity and electrical performance for conduction of steady state direct electrical current of the just described seals is excellent.

With the increasing use of pulsating and alternating current in circuit design it has become evident that a significant loss of power occurs when high frequency signals must pass through the 52 alloy eyelet via the copper conductor. When sufficient signal energy exists, the eyelet temperature can possibly increase up to the point of melting the soft solder joint which is used to hermetically seal the copper lead wire conductor to the eyelet.

The resultant drain of power from these electronic circuits requires that the circuits deliver more power. This results in increased weight and size for these electronic or electrical devices and equipment to overcome the losses due to the the hermetic seal effects.

The losses are primarily ferro-magnetic and partially due to skin-effect or eddy current.

To overcome these losses we investigated available non-magnetic materials which could match suitable sealing glasses and have found that Hastelloy B alloy (consisting essentially of 65% nickel and 30% molybdenum) possesses an acceptably low coefficient of thermal expansion.

The construction of a seal with Hastelloy B proved entirely satisfactory and is the preferred embodiment of the present invention. Hastelloy B is a trademark of Cabot Corporation of Kokomo, Ind.

Investigation has shown that compression, hermetic glass-to-metal seals introduce heating and power loss when used as feed-throughs for signal conductors handling high amperage pulsating currents. These effects are now found to result from induction heating of the nickel 52 inner member or eyelet.

The cause of the heating is not precisely known, and might be falsely attributed to the construction of the capacitor or to dielectric heating of the glass seal or to any of the other components. An isolation test was performed in which it was discovered that the small nickel 52 eyelet having a conductor passed therethrough carrying a current was readily heated, particularly if the inside diameter of the aperture were relatively close to that of the diameter of the wire, as in seals of the present type. This heating mechanism was felt to be directly analogous to RF induction heating (i.e., magnetic induction heating, and eddy current induction heating, or some combination). Substitution of a non-magnetic stainless steel eyelet in this experiment resulted in virtually no heating whatsoever. However, a compression seal of this type cannot be constructed to use these results since stainless steel is unsuitable in glass to metal hermetic bonds because of its coefficient of thermal expansion is too high. A non-magnetic metal having a good capability of bonding to glass was desired; and also having a property of an acceptable thermal expansion coefficient. Of all alloy materials readily available, only the alloy Hastelloy B (consisting essentially of 65% nickel and 30% molybdenum) possessed an acceptably low coefficient of thermal expansion, was known to be non-magnetic and makes a good bond to glass. The construction of a seal with Hastelloy B proved entirely satisfactory and is the preferred embodiment of the present invention.

The selection of a material for use as the inner eyelet member is critical and such a material must have the following properties:
1. The material must be non-ferromagnetic.
2. The material must possess good chemical bonding properties during the sealing operation.
3. The coefficient of thermal expansion must be compatible with the glass to maintain hermeticity.
4. The elasticity characteristics of the alloy should be compatible with the glass so as to allow equalization of compressive forces created without setting up unduly high stesses.
5. The material must be relatively inexpensive.

It has been found that the alloy commonly known as Hastelloy B* has the properties required and is entirely suitable and the preferred metal alloy for use in the present invention. Hastelloy B is an alloy of about 64% nickel and 28% molybdenum with other percentages of alloying material being limited to about ½% carbon, 5% iron, 2.5% cobalt and 1% chromium. This alloy is widely used for its outstanding corrosion resistance. The coefficient of thermal expansion, of Hastelloy B is about 100 cm/cm × $10^{-7}$/°C. and will bond very well to glasses such as Corning 9013 and 9010 which have thermal coefficients of expansion of about 95 cm/cm × $10^{-7}$/°C.

Testing has also shown that the use of a non-ferromagnetic outer ring further reduces the effects of induction heating.

In the present invention a non-magnetic outer ring made of monel or non-magnetic stainless steel 304 is used to reduce induction heating. The inner member is a hollow or solid tube. The glass is Corning 9013 and 9010.

In the specifications, the following abbreviations may be used in the following descriptions.
- Nickel = Ni
- Molybdenum = Mo
- Tungsten = W
- Hastelloy = Hastelloy B, TM of Cabot Corporation. (Other Hastelloy trademarked products are not included.)
- Platinum = Pt
- Palladium = Pd The following units are used through this description: coefficient of linear expansion—cm/cm/°C. × $10^{-7}$. Percentage compositions of alloys given herein in weight percent (w/o), in accordance with common engineering practice. 300 Series steels, such as 304, refer to AISI designations.

Before any investigation to solve this problem was made, consideration was given to the use of copper-to-glass seals. Copper-to-glass seals, however, are not practical for the following reasons: the type of glass used with copper seals is soluable in solutions used in plating. Copper must be plated prior to the sealing step to ensure a good metal-to-glass bond. In addition, copper-to-glass seals do not maintain hermeticity after being exposed to temperature cycling.

SUMMARY OF THE INVENTION AND OBJECTS

It is the general object of the present invention to provide a compression glass to metal hermetic seal which will overcome the above limitations and disadvantages.

A further object of the invention is to provide a compression seal of the above character which is relatively free of inductive loss when passing pulsating currents. A further object of the invention is to provide a hermetic compression seal of the above character which is reliable in operation, having an excellent glass-to-metal bonding character, and which is inexpensive to construct and may be manufactured with non-critical procedures.

A further object of the invention is to provide a compression seal of the above character which is relatively free of power loss when passing pulsating currents. A further object of the invention is to provide a hermetic compression seal of the above character which is reliable in operation, having an excellent glass-to-metal bonding character, and which is inexpensive to construct.

DETAILED DESCRIPTION OF THE PREFERRED EMBODIMENT

Figure 1:
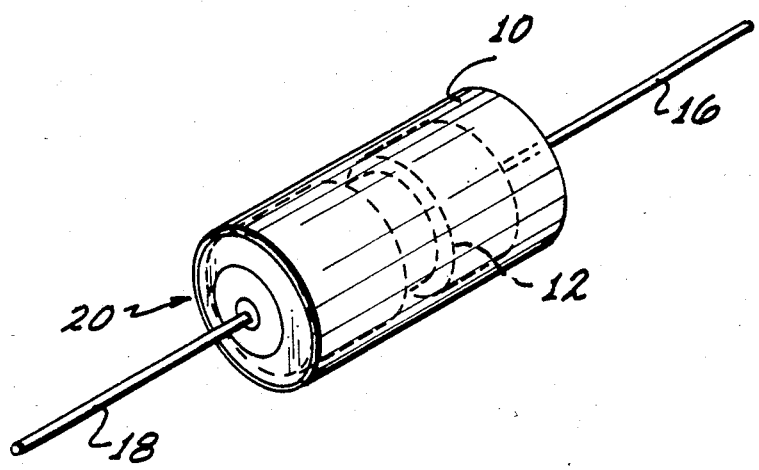
FIG. 1 is a perspective view of a capacitor incorporating a hermetic glass to metal compression seal constructed in accordance with the present invention.
Figure 2:
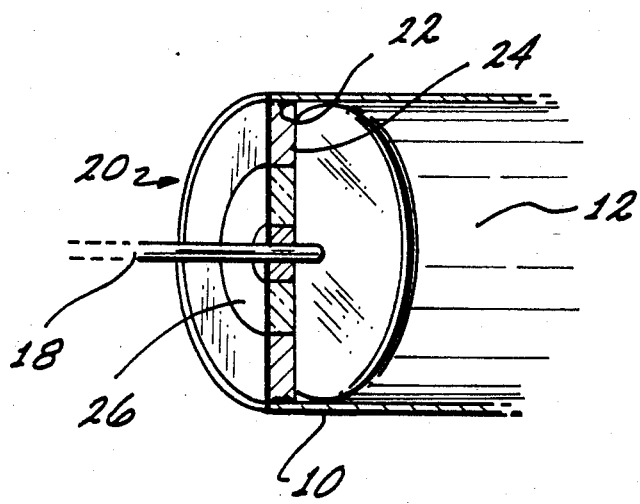
FIG. 2 is a cross-sectional view partially broken away of one of the compression seals of the component of FIG. 1.
Figure 3:
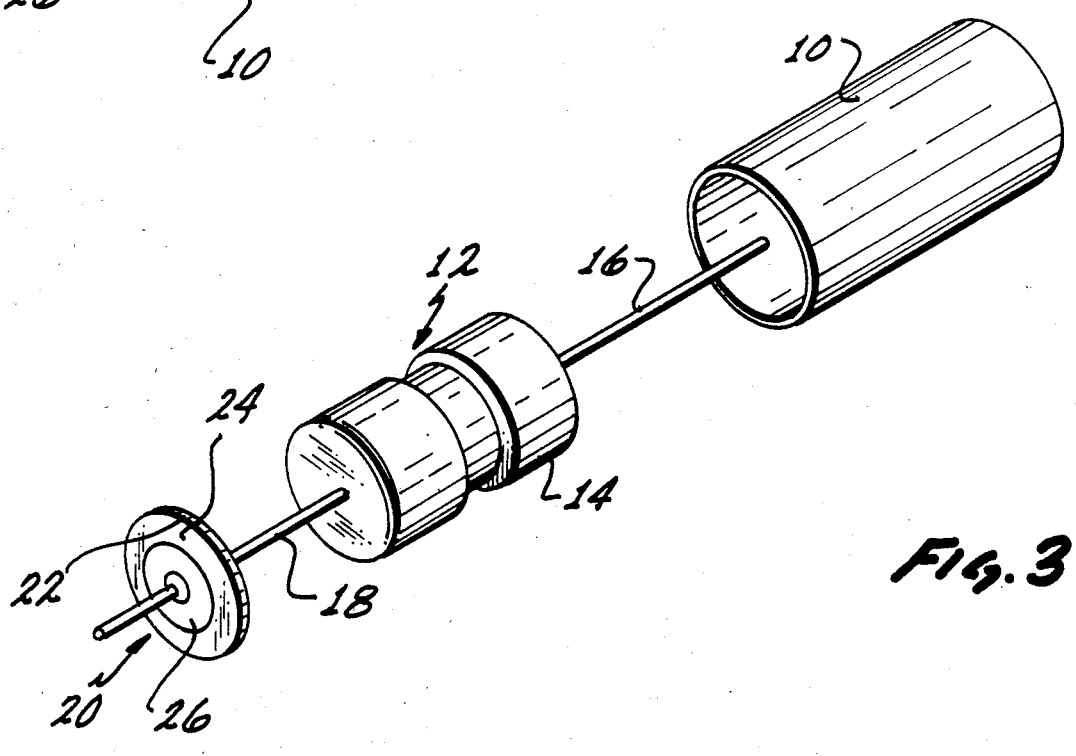
FIG. 3 is an exploded view of the end seal and the capacitor construction of the capacitor of FIG. 1.

Referring now to FIGS. 1 and 3, there is shown a capacitor component which is constructed in accordance with the present invention and includes an outer metal case 10 surrounding a capacitor 12 which may be insulated from the case by a plastic sheath 14. The capacitor has electrical leads consisting of wires 16,18 which pass through end seals 20. Each end seal is of the hermetic type in which an outer metal ring 22 compressively loads an intermediate disc 24 made of glass which surrounds and is fused to an eye of metal 26. The assembly of the unit involves physically locating the various parts together in the designed manner of assembly and subjecting the joints between the ring 22 and the can 10 to RF or other heating so as to fuse a solder or brazing alloy to join these parts. The eyelets at each end 26 are soldered to the respective leads 16,18 by direct application of flame heat.

Difficulties previously experienced due to heating of capacitor components, have finally been traced to heating of the eyelet. The metal eyelet serves as a transition from the glass to the lead itself and permits manufacture of the hermetic seal as a distinct and separate component part so that its manufacture is normally accomplished in a specialized glassworks, whereas the component itself may be manufactured as other electrical components and fused to the hermetic seal with brazing and soldering techniques. The eyelet must possess a number of desirable characteristics in order to be successful. It has been found that, when made of a material which is non-ferromagnetic at the temperature of operation, induction heating losses can be reduced to a level substantially below current experience and made capable for severe applications where reduction of component size to a minimum is essential.

It has been found that the alloy commonly known as Hastelloy B is entirely suitable for this purpose and is a preferred metal alloy for use in the present invention. Hastelloy B is an alloy of about 64% nickel and 28% molybdenum with other percentages of alloying material being limited to about 0.5% carbon, 5% iron, 2.5% cobalt and 1% chromium. This alloy is widely used for its outstanding corrosion resistance, particularly in as welded condition without further treatment and data is available for its use in that application, but relatively little electrical and magnetic data is available for use in the present application. Even so, Hastelloy B is found to possess a low Curie temperature, so that it is non-ferromagnetic at temperatures of operaton down to $-65°$ C. In general, the coefficient of thermal expansion is about 100 cm/cm$\times 10^{-7}$/°C. and when properly treated, bonds very well to glasses such as Corning 9013 and 9010 which have thermal coefficients of expansion of about 95 cm/cm$\times 10^7$/°C. Hastelloy B is essentially paramagnetic at all temperatures of operation and is found to have low magnetic and electrical losses. Platinum, palladium, and nickel-tungsten alloy are also expected to be operable in this invention but possess one or more disadvantages, usually relating to cost and availability.

The following analysis is based upon a review of the literature and is given in aid of understanding the scope of the invention and the way that the useful materials can be distinguished. Hastelloy B has an excellent induction heating characteristic from the view of RF heating. RF heating has a depth of penetration which is related to the bulk resistivity and magnetic permeability as a function of temperature in such a way that as the temperature goes up, the resistivity should go up, which is true for Hastelloy B. Also, as the temperature goes up, the magnetic permeability goes down, so as to give greater penetration. Induction heating also depends on the third power of the magnetic field concentration so that it is particularly important that the penetration be good so as to avoid high surface heating. While these factors may or may not be applicable in certain current carrying circumstances, they can become applicable as the strength of the field strength increases significantly. Platinum is expected to be somewhat less satisfactory in the above analysis, but still workable. Similar nickel-tungsten alloy and palladium characteristics are not available.

With respect to thermal expansion, Hastelloy B is found to be excellent since it is compatible with a wide range of available glasses. Platinum is also excellent as is palladium. Nickel-tungsten alloy is expected to be good-to-excellent based on predictions from the known expansion coefficients of nickel-tungsten, and the considerable similarity of the curve temperature curve in the phase diagrams of the nickel-tungsten systems to nickel-molybdenum.

With respect to bonding to glasses, the Hastelloy B is found to be excellent, particularly when assembled with relatively conventional manufacturing technology as will be briefly outlined hereinafter. Both the platinum and palladium have known bonding characteristics which are at least fair. Nickel-tungsten alloy bonding characteristics are not known. The electrical properties of the metal alloy of the eyelet include a resistivity that is as low, since it is the major source of $I^2R$ heating, if the configuration demands the eyelet to carry current. However, if the eyelet is an intermediate section surrounding a high conductivity copper lead, for example, its $I^2R$ loss will be low in any event, so that such a coaxial structure is to be desired. The coaxial configuration of Hastelloy B eyelet with a high conductivity lead such as copper is excellent. In this connection, it might further be mentioned that the electrical resistivity plays several roles, and the exact mechanism for a particular signal may be different than for other signals. In that connection, it is found that it is desirable that the electrical resistivity be high in order to minimize eddy current losses. On this ground it would appear that a composite of a Hastelloy eyelet and a copper lead is the most satisfactory combination from the point of view of obtaining a non ferro-magnetic material to eliminate the hysteresis loss of both the stress and rotational type, that the eyelet resistivity is high to minimize eddy current losses by induction; that the cost of these materials is quite low; and that the thermal coefficient of expansion and temperature dependence thereof is compatible with glass.

The eyelet alloy must exhibit good chemical resistance to corrosion of a moderate type, and must possess good chemical bonding properties in glass sealing operations. It is useful if an oxide film can be formed to provide for a good glass to metal bond. In this connection, Hastelloy is good and platinum is fair.

The cost, of course, of Hastelloy B is relatively low, so as to make it an excellent candidate, whereas the cost of platinum is so high as to make it prohibitive in all but the most unusual situations.

The electromagnetic stability of all of these materials is high, so that this is not a factor; nor is the density, thermal conductivity, thermal diffusion, or specific heat. The formability of platinum is excellent whereas that of Hastelloy B is only fair.

The elasticity characteristics of the alloy should be compatible with the glass disc and with the outer compression ring, so as to allow equalization of compressive forces created without setting up unduly high stresses. In this application, Hastelloy B is found to be good, while the elasticity properties of platinum in this connection are not known even though its tensile data would appear to be good, and ductibility appear to be at least fair. It must be appreciated that the chemical bonding and thermo elastic properties of Platinum contain a sufficient number of variables, therefore it is difficult to predict, much less find, an alloy which is assuredly satisfactory. Thus, it is a surprising result that this relatively common alloy, Hastelloy B, should possess all of the properties which are required for a good seal, possess relatively few, if any, disadvantages. It is found that the combination of a simple outer seal ring with the glass and Hastelloy B material results in an exceptionally high quality seal which has no chemical or mechanical or electrical disadvantages insofar as the present testing admits.

It might be mentioned that Hastelloy B is a relatively old alloy, being known for about forty years at the time of this writing. However, in its initial version was difficult to obtain with controlled silicon and carbon content, which can prevent precipitation of carbides. This has been largely overcome in Hastelloy B-2. This property, however, is not relied upon and either the older Hastelloy B-1 or the newer Hastelloy B-2 are satisfactory.

Generally, the metal preparation includes passing the Hastelloy through a hot, high humidity hydrogen atmosphere to act as a reducing media and create a good bonding surface (to glass).

In addition to essential reduction of heat achieved by substitution of a non-ferromagnetic metal or alloy in the eyelet, it is found that a further induction heating reduction is achieved by substituting a non-ferromagnetic stainless steel such as SS 304 as the material of which the outer compression ring is made. In order to obtain the desired compression the thermal coefficient of expansion should remain high. Stainless steel 304 at 190 cm/cm/°C.$^{-7}$ is satisfactory.

We claim:

1. In a glass-to-metal seal surrounding a conductor passing therethrough an outer ring, a glass disc, and an inner eyelet of non-ferromagnetic material concentrically assembled inside said glass disc and ring, said glass being selected from glasses having a coefficient of thermal expansion of about 90 to 125 cm/cm/°C.$\times 10^{-7}$, said eyelet being made of nickel-molybdenum alloys having a nickel percentage of 65% to 74% and a molybdenum percentage of 26% to 30%.

2. In a glass-to-metal hermetic seal for surrounding and being sealed to an electrical conductor passing through the same and soldered thereto, a glass or ceramic wall, an eyelet interposed between the conductor and the glass or ceramic wall, said eyelet being formed of a non-ferromagnetic alloy or metal and having a coefficient of thermal expansion characteristic compatible for sealing with said glass or ceramic wall whereby said eyelet operates with low electric and magnetic losses due to induced currents therein, and means forming a metallurgical bond between said electrical conductor and said eyelet, said eyelet being made of an alloy of nickel and molybdenum having the composition of nickel of 65% to 74% and molybdenum 26% to 30%.

3. A glass-to-metal seal comprising an outer ring of metal, an inner eyelet of metal, and an annular disc of glass, said ring eyelet and disc formed in heated relation to each other so that the glass, when cooled, is placed in compression by the ring to thereby compress the eyelet, said seal adapted to have an electrical signal carrying conductor passed through said eyelet and bonded thereto with solder, said eyelet being selected from a material characterized by being bondable to the glass component and having a coefficient of thermal expansion matching that of the glass, and further characterized as non-ferromagnetic and exhibiting low magnetic and electrical induction losses so as to minimize heating therefrom, said eyelet being made of an alloy of nickel and molybdenum having the composition of nickel of 65% to 74% and molybdenum 26% to 30%.

4. The seal of claim 3 further characterized that said compression ring is also non-ferromagnetic.

5. The seal as in claim 3 in which said compression ring is made of non-ferromagnetic stainless steel.

6. The seal as in claim 3 in which said stainless steel is non-magnetic 304 alloy (AISI).

7. A method for eliminating heating losses from induced electric and magnetic fields caused by electrical pulses passing along leads passed through hermetic end seals of electrical components of the type enclosed in a can hermetically closed at least one end by such an end seal comprising the steps of forming each end seal with an outer metal ring enclosing a glass disc having a metal eyelet therein through which the lead passes, the same being assembled when heated so that, after being cooled, compression is developed by the ring which is transferred through the disc to the eyelet, selecting the material of which said eyelet is made from a non-ferromagnetic nickel-molybdenum alloy having a cooefficient of thermal expansion of the approximate formula of Hastelloy B having a coefficient of thermal expansion of about 100 cm/cm/°C.$\times 10^{-7}$ and matching that of the glass disc, said alloy exhibiting a low magnetic and electrical induction loss characteristic.

8. The method as in claim 7 in which said glass is selected from the potash lead and potash soda lead glasses having a thermal expansion coefficient of about 90 to about 125 cm/cm/°C.$\times 10^{-7}$.

9. The method as in claim 7 in which the outer ring is monel or non-magnetic stainless steel 304 (AISI).

* * * * *